US012570927B1

(12) United States Patent
Li et al.

(10) Patent No.: US 12,570,927 B1

(45) Date of Patent: Mar. 10, 2026

(54) CLEANSING AND CARE COMPOSITION, PREPARATION METHOD THEREOF, AND CLEANSING AND CARE TABLET

(71) Applicant: Guangzhou Joyson Cleaning Products Co., Ltd., Guangzhou (CN)

(72) Inventors: Fenglei Li, Guangzhou (CN); Jieer Luo, Guangzhou (CN); Junli Li, Guangzhou (CN); Jianfeng Sun, Guangzhou (CN); Jieting Yan, Guangzhou (CN)

(73) Assignee: Guangzhou Joyson Cleaning Products Co., Ltd., Guangzhou (CN)

( * ) Notice: Subject to any disclaimer, the term of this patent is extended or adjusted under 35 U.S.C. 154(b) by 0 days.

(21) Appl. No.: 19/305,890

(22) Filed: Aug. 21, 2025

Related U.S. Application Data

(63) Continuation of application No. PCT/CN2025/108550, filed on Jul. 15, 2025.

(51) Int. Cl.
*C11D 3/00* (2006.01)
*C11D 1/10* (2006.01)
(Continued)

(52) U.S. Cl.
CPC ................ *C11D 3/222* (2013.01); *C11D 1/10* (2013.01); *C11D 1/94* (2013.01); *C11D 3/2044* (2013.01);
(Continued)

(58) Field of Classification Search
None
See application file for complete search history.

(56) References Cited

U.S. PATENT DOCUMENTS 7,199,096 B1 4/2007 Weuthen
11,760,962 B1 9/2023 Sun et al.
(Continued)

FOREIGN PATENT DOCUMENTS

AU 2024205605 B1 2/2025
WO WO-2014158472 A1 * 10/2014 ......... C11D 17/0047

OTHER PUBLICATIONS

People's Republic of China (PRC) national standard, "Test method for biodegradability of surfactants", Dec. 28, 2018, 40 pages.
(Continued)

*Primary Examiner* — Necholus Ogden, Jr.
(74) *Attorney, Agent, or Firm* — Cooper Legal Group, LLC

(57) ABSTRACT

Disclosed are a cleansing and care composition, a preparation method thereof and a cleansing and care tablet. A cleansing and care composition, wherein a raw material for preparing the cleansing and care composition includes the following components in parts by mass: amino acid surfactant: 10-30 parts; anionic surfactant: 1-20 parts; plant polysaccharide: 15-45 parts; shape promoting agent: 5-15 parts; nonionic surfactant: 1-10 parts; amphoteric surfactant: 0.5-5 parts; plant extract: 0.5-5 parts; humectant: 0.5-5 parts; chelating agent: 0.1-5 parts; essence: 0-5 parts; enzymatic preparation: 0-5 parts; and water: 20-105 parts. The cleansing and care tablet produced in the present application possesses low-irritation and mild properties, can be directly contacted with skin, exhibits a moderate dissolution rate and moderate cleansing power, and can be applicable to fields including hair washing, bathing, facial cleansing, hand washing, intimate apparel cleaning, baby and maternity textile cleaning, and toy cleaning.

7 Claims, 7 Drawing Sheets

(51) Int. Cl.

| | |
|---|---|
| ***C11D 1/94*** | (2006.01) |
| ***C11D 3/20*** | (2006.01) |
| ***C11D 3/22*** | (2006.01) |
| ***C11D 17/00*** | (2006.01) |

(52) U.S. Cl.
CPC ........ *C11D 3/2065* (2013.01); *C11D 17/0086* (2013.01); *C11D 2111/12* (2024.01)

(56) References Cited

U.S. PATENT DOCUMENTS

| | | | | |
|---|---|---|---|---|
| 12,281,285 | B1 | 4/2025 | Li et al. | |
| 2006/0223739 | A1 | 10/2006 | Zhu et al. | |
| 2023/0174898 | A1 | 6/2023 | Anderson et al. | |
| 2024/0209294 | A1* | 6/2024 | Sun ...................... | C11D 3/2079 |
| 2024/0228915 | A1 | 7/2024 | Sun et al. | |
| 2025/0066698 | A1 | 2/2025 | Sun et al. | |

OTHER PUBLICATIONS

People's Republic of China (PRC) national standard, "Technical specification for safety of washing products", May 12, 2011, 12 pages.
People's Republic of China (PRC) national standard, "Determination of detergency and cyclic washing performance of detergents for clothing", Mar. 9, 2021, 55 pages.
The Chinese people National standards of the Republic, "Kitchen oil cleaner", Feb. 6, 2018, 23 pages.
People's Republic of China (PRC) light industry standard, "Laundry tablets", Apr. 21, 2023, 16 pages.
People's Republic of China (PRC) light industry standard, "Hard floor cleaning agent", Oct. 17, 2013, 19 pages.
The Chinese people China's national standards, "Paper—Determination of softness", Dec. 13, 2016, 11 pages.
The Chinese people China's national standards, "Determination of antistatic properties of fabric conditioners", Dec. 31, 2013, 28 pages.
People's Republic of China (PRC) light industry standard, "Determination of rewetting performance of fabric softener", Apr. 21, 2023, 18 pages.
Non-Final Office Action received in corresponding U.S. Appl. No. 19/305,858, dated Oct. 27, 2025, 12 pages.
Non-Final Office Action received in corresponding U.S. Appl. No. 19/295,834, dated Sep. 26, 2025, 17 pages.

* cited by examiner

CLEANSING AND CARE COMPOSITION, PREPARATION METHOD THEREOF, AND CLEANSING AND CARE TABLET

CROSS-REFERENCE TO RELATED APPLICATION

The present application is a continuation of PCT application serial no. PCT/CN2025/108550, filed on Jul. 15, 2025. The entirety of PCT application serial no. PCT/CN2025/108550 is hereby incorporated by reference herein and made a part of this specification.

TECHNICAL FIELD

The present application relates to the field of cleaning articles, and in particular to a cleansing and care composition, a preparation method thereof, and a cleansing and care tablet.

BACKGROUND ART

Amino acid surfactants have become an ideal alternative to traditional surfactants due to the mildness, environmental friendliness, and multifunctionality, gaining significant popularity in personal care, cosmetics, and cleaning products in recent years, particularly in sensitive skin care, premium personal care, and green product development. In existing applications, cleansing tablets incorporating amino acid surfactants adhered to cotton pads offer portability advantages but suffer from poor dissolubility and powder shedding. To enhance dissolubility, cleansing and care tablets have been developed by incorporating amino acid surfactants with polyethylene glycol or polyvinyl alcohol as film-forming agents.

A disadvantage of applying amino acid surfactants is the great difficulty in thickening. Amino acid surfactants typically exhibit a high critical micelle concentration, meaning higher concentrations are required to form micelles. In formulations, even with substantial addition amount of amino acid surfactants, the effective micelle concentration may remain insufficient to support viscosity. Instead, the dilution effect causes system thinning, while hydrophilic polyol molecules may alter solvent polarity, compete for water molecules, further weaken interactions between surfactant micelles, and interfere with the self-assembly behavior. Consequently, it is challenging to form solid cleansing and care tablets with good flexibility in formulations where amino acid surfactants serve as the main surfactants.

SUMMARY

In order to improve the flexibility of a cleansing and care tablet using an amino acid surfactant as a main surfactant, the present application provides a cleansing and care composition, a preparation method thereof and a cleansing and care tablet.

In a first aspect, the present application provides a cleansing and care composition adopting the following technical solution:

A cleansing and care composition, wherein a raw material for preparing the cleansing and care composition includes the following components in parts by mass:

amino acid surfactant: 10-30 parts; anionic surfactant: 1-20 parts; plant polysaccharide: 15-45 parts; shape promoting agent: 5-15 parts; nonionic surfactant: 1-10 parts; amphoteric surfactant: 0.5-5 parts; plant extract: 0.5-5 parts; humectant: 0.5-5 parts; chelating agent: 0.1-5 parts; essence: 0-5 parts; enzymatic preparation: 0-5 parts; and water: 20-105 parts;

wherein a mass ratio of the amino acid surfactant to the anionic surfactant is (1.5-14):1, a ratio of a total mass of the amino acid surfactant, anionic surfactant, nonionic surfactant, and amphoteric surfactant to a mass of the plant polysaccharide is (0.8-3.5):1, and a mass ratio of the plant polysaccharide to the shape promoting agent is (1-6):1.

By using the above technical solution, the plant polysaccharide serves as a thickener to significantly increase slurry viscosity, enabling systems where amino acid surfactants act as the main surfactants to also form dense foam while maintaining slurry viscosity. This facilitates the formation of cleansing and care tablets after slurry drying, endowing the cleansing and care tablets with excellent pliability. Additionally, the proportional combination of the amino acid surfactant with other surfactants helps to maintain the consistency of the slurry, promotes the formation of cleansing and care tablets, and enhances the stain-removing and degreasing capabilities of the cleansing and care composition. Moreover, the plant polysaccharide and shape promoting agent collaboratively establish a three-dimensional network structure that improves the flexibility of cleansing and care tablet and mitigates moisture absorption issues.

As a biobased material, the plant polysaccharide provides distinct advantages over cleansing and care tablets using petroleum-derived film-forming agents such as polyethylene glycol or polyvinyl alcohol. The cleansing and care tablets of the present application exhibit non-irritating properties and high biodegradability, aligning with contemporary demands for green sustainability and safety. Furthermore, since the plant polysaccharide is dissoluble at room temperature or at a low temperature, the cleansing and care tablet obtained is applicable to different water temperatures in various seasons.

Alternatively, the amino acid surfactant includes at least two of sodium lauroyl/cocoyl methylaminopropionate, sodium lauroyl/cocoyl methyltaurate, sodium cocoyl apple amino acid, sodium lauroyl aspartate, sodium lauroyl/cocoyl glycinate, sodium lauroyl/cocoyl glutamate, and sodium lauroyl/cocoyl sarcosinate.

By using the above technical solution, the hydrophilic amino acid salt group and hydrophobic fatty acid chain in the molecular structure of the amino acid surfactant act synergistically. Through reducing the surface tension of liquids, the amino acid surfactant effectively removes oils and dirt, making it especially suitable for sensitive skin, which achieves exfoliation, cleanses the skin, and delivers comprehensive cleansing and care effects.

Alternatively, the plant polysaccharide includes at least two of alginate, pectin, xanthan gum, guar gum, hydroxypropyl starch ether, methyl cellulose, hydroxyethyl cellulose, konjac glucomannan, hydroxypropyl methyl cellulose, and pullulan.

By using the above technical solution, the plant polysaccharide exhibits excellent water solubility and enables the slurry of the cleansing and care composition to maintain dense and stable foam, thereby facilitating the forming of cleansing and care tablets and enhancing their flexibility.

Alternatively, the shape promoting agent is a $C_3$-$C_8$ polyol.

By using the above technical solution, the $C_3$-$C_8$ polyhydric alcohol can prevent the plant polysaccharide from clumping when contacting with water, and improve the dispersion stability of the slurry; in addition, during the preparation of the cleansing and care tablet, the $C_3$-$C_8$ polyol can combine with multiple reaction sites of the plant polysaccharide to form a three-dimensional network structure and increase the crosslinking density, thereby better shaping of the cleansing and care tablet and improving the toughness of the cleansing and care tablet.

Alternatively, the $C_3$-$C_8$ polyhydric alcohol includes at least one of glycerol, propylene glycol, butanediol, hexanediol, heptanediol, and octanediol.

Alternatively, the anionic surfactant includes at least one of sodium alkyl glycoside sulfosuccinate, sodium α-olefin sulfonate, and sodium alkyl hydroxyethyl sulfonate.

Alternatively, the nonionic surfactant includes at least one of $C_{8-18}$ alkyl glycoside, sophorolipid, rhamnolipid, lauramidopropyl/cocamidopropyl amine oxide, and sucrose fatty acid ester; and the amphoteric surfactant includes at least one of lauramidopropyl/cocamidopropyl hydroxysultaine, lauramidopropyl/cocamidopropyl betaine, cocamidoethyl betaine, lauryl/cocoyl hydroxysultaine, sodium lauroyl/cocoyl amphoacetate, and sodium lauroyl/cocoyl amphopropionate.

Alternatively, the $C_{8-18}$ alkyl polyglucoside includes at least one of decyl glucoside, lauryl glucoside, alkyl maltoside, cetearyl glucoside, and palm glucoside.

By using the above technical solution, the anionic surfactant, nonionic surfactant, and amphoteric surfactant act synergistically to deliver stain-removing and degreasing effect.

Alternatively, the chelating agent includes at least one of sodium citrate, sodium gluconate, tetrasodium glutamate diacetate, trisodium methylglycine diacetate, sodium polyaspartate, and sodium polyglutamate.

By using the above technical solution, the chelating agent can chelate metal ions in hard water or tap water, and form a synergistic and superior water softening effect with the plant polysaccharide, and the chelating agent can play the role of adjusting the value of pH of the slurry.

Alternatively, the humectant includes at least one of allantoin, dextran, biomimetic phospholipids, trehalose, and water-soluble olive oil.

By using the above technical solution, in personal care applications, the humectant forms a transparent gel film on the epidermis to provide long-lasting hydration and barrier restoration for skin and hair; in fabric laundering applications, the humectant penetrates fiber surfaces to repair minor damage caused by friction, sun exposure, or chemical detergents, enhances fabric resilience, repairs protein fibers such as wool and silk, helps restore elasticity, and reduces pilling. The humectant further maintains fiber moisture content to prevent drying and embrittlement.

Alternatively, the plant extract includes at least one of *Plukenetia volubilis* fruit extract, *Theobroma grandiflorum* seed extract, *Orbignya oleifera* kernel extract, *Oryza sativa* bran extract, *Sapindus mukorossi* fruit extract, *Camellia oleifera* seed cake extract, *Aloe barbadensis* leaf extract, and *Matricaria chamomilla* flower extract.

By using the above technical solution, the plant extract delivers natural antibacterial effect while moisturizing and nourishing the skin.

In a second aspect, the present application provides a method for preparing the cleansing and care composition, adopting the following technical solution:

A method for preparing the cleansing and care composition, including the following steps:

mixing the plant polysaccharide with the shape promoting agent under stirring to wet a solid powder of the plant polysaccharide with the shape promoting agent to obtain a premix;

mixing the anionic surfactant and the amino acid surfactant with a pre-heated water, and after standing until completely dissolved into a homogeneous phase, adding the premix in batches under stirring to obtain a mixture; and adding the nonionic surfactant and the amphoteric surfactant to the mixture; adding the chelating agent to adjust a value of pH to 5.5-7; adding the plant extract and continuing stirring; adding the humectant and continuing the stirring; and adding the enzymatic preparation in liquid form and the essence to obtain the cleansing and care composition.

By using the above technical solution, since a large amount of plant polysaccharides are directly combined with water to form lumps, and after the plant polysaccharides outside the lumps absorb water and swell, the plant polysaccharides inside cannot be dissolved to form the premix at first, and therefore the plant polysaccharides are firstly mixed with the shape promoting agent for wetting, so as to promote the subsequent dissolution of plant polysaccharides in the mixture.

The anionic surfactant is mixed with water and allowed to dissolve statically without stirring, thereby preventing foam formation prior to the addition of plant polysaccharides, which facilitates subsequent complete water absorption and swelling of the plant polysaccharides, providing the mixture with appropriate viscosity and maintaining dense foam.

In a third aspect, the present application provides a cleansing and care tablet, adopting the following technical solution:

A cleansing and care tablet, produced by drying and then slicing the cleansing and care composition; wherein, if the enzymatic preparation in the cleansing and care composition is in solid form, the enzymatic preparation is not added when preparing the cleansing and care composition, but is instead sprinkled onto sliced tablets.

By using the above technical solution, the cleansing and care tablet containing amino acid surfactant with excellent flexibility is obtained. The cleansing and care tablet exhibits superior performance in stain-removing and skin cleansing, and at the same time has high biodegradability and high environmental friendliness.

Alternatively, the cleansing and care composition is dried by a casting method, where the slurry is cast and then formed through air-blowing drying equipment.

In summary, the application has the following technical effects:

1. The plant polysaccharide serves as a thickener to significantly increase slurry viscosity, enabling systems where amino acid surfactants act as the main surfactants to also form dense foam while maintaining slurry viscosity. This facilitates the formation of cleansing and care tablets after slurry drying, endowing the cleansing and care tablets with excellent pliability. Additionally, the proportional combination of the amino acid surfactant with other surfactants helps to maintain the consistency of the slurry, promotes the formation of cleansing and care tablets, and enhances the stain-removing and degreasing capabilities of the cleansing and care composition. Moreover, the plant polysaccharide and shape promoting agent collaboratively establish a three-dimensional network structure that improves the flexibility of cleansing and care tablet and mitigates moisture absorption issues.

2. The hydrophilic amino acid salt group and hydrophobic fatty acid chain in the molecular structure of the amino acid surfactant act synergistically. Through reducing the surface tension of liquids, the amino acid surfactant effectively removes oils and dirt, making it especially suitable for sensitive skin, which achieves exfoliation, cleanses the skin, and delivers comprehensive cleansing and care effects.

DETAILED DESCRIPTION

Figure 1:
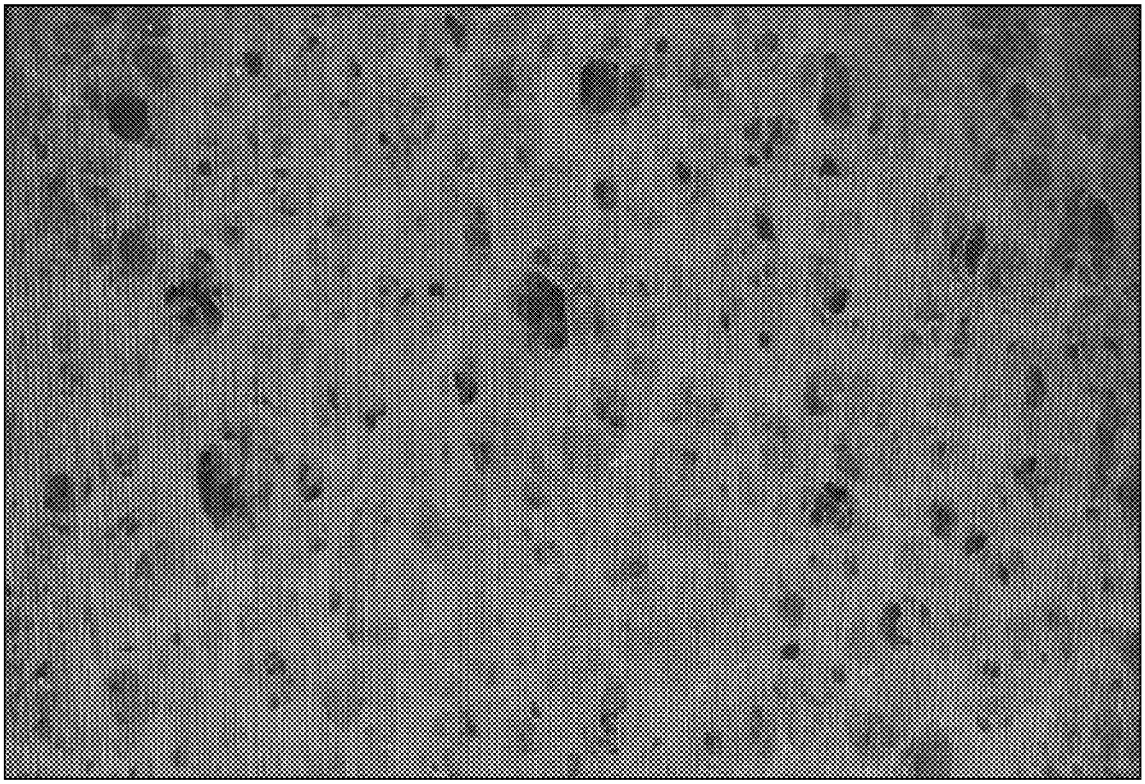
FIG. 1 is an enlarged micro-configuration of a cleansing and care tablet in Application Example 1 of the present application.

The present application is further described in detail below with reference to FIGS. 1-7.

Example 1

A cleansing and care composition, wherein a raw material for preparing the cleansing and care composition included the following components in parts by mass:

amino acid surfactant: 28 parts; anionic surfactant: 2 parts; nonionic surfactant: 3 parts; amphoteric surfactant: 3 parts; plant polysaccharide: 45 parts; shape promoting agent: 9 parts; plant extract: 1.8 parts; humectant: 1 parts; chelating agent: 0.8 parts; enzymatic preparation: 0.5 part; and water: 100 parts.

Specifically, the amino acid surfactant consisted of 14 parts of sodium lauroyl methylaminopropionate and 14 parts of sodium lauroyl sarcosinate;

the anionic surfactant was 2 parts of sodium alkyl polyglucoside sulfosuccinate;

the nonionic surfactant was sophorolipid;

the amphoteric surfactant was cocamidopropyl hydroxysultaine;

the plant polysaccharide consisted of 30 parts of alginate and 15 parts of hydroxyethyl cellulose;

the shape promoting agent consisted of 4 parts of propylene glycol and 5 parts of glycerol;

The plant extract consisted of 0.1 part of *Plukenetia volubilis* fruit extract, 0.1 part of *Theobroma grandiflorum* seed extract, 0.1 part of *Orbignya oleifera* kernel extract, 1 part of *Oryza sativa* bran extract, and 0.5 part of *Sapindus mukorossi* fruit extract;

the humectant consisted of 0.5 part of allantoin and 0.5 part of biomimetic phospholipid;

the chelating agent consisted of 0.4 part of sodium polyaspartate and 0.4 part of sodium polyglutamate;

the enzymatic preparation was cellulase enzyme.

A method for preparing the cleansing and care composition, which included the following steps:

the plant polysaccharide was mixed with the shape promoting agent under stirring to wet a solid powder of the plant polysaccharide with the shape promoting agent to obtain a premix;

the anionic surfactant and amino acid surfactant were mixed with the water at 50° C., after standing until completely dissolved into a homogeneous phase, the premix was added in batches and stirred at a rotating speed of 1050 r/min for 15 minutes, so that the plant polysaccharide absorbed water sufficiently and swelled to provide viscosity for the slurry to obtain a mixture, wherein the viscosity of the mixture was controlled to be 10000±5000 mpa·S; and the nonionic surfactant and the amphoteric surfactant were added to the mixture; the chelating agent was added to adjust a value of pH to 5.5-7; the plant extract was added and continued stirring; the humectant was added and continued the stirring; and the enzymatic preparation and the essence were added to obtain the cleansing and care composition.

Examples 2 to 7

The difference between Examples 2 to 7 and Example 1 of the cleansing and care compositions lies in that the raw materials for preparing the cleansing and care compositions are different, and the specific raw materials are as shown in Table 1.

TABLE 1

| Parts by mass | | Example 1 | Example 2 | Example 3 | Example 4 | Example 5 | Example 6 | Example 7 |
|---|---|---|---|---|---|---|---|---|
| Plant polysaccharide | Alginate | 30.00 | | | 10.00 | | 24.00 | 5.00 |
| | Xanthan Gum | | 10.00 | | | 3.00 | | |
| | Guar gum | | | 10.00 | | | | |
| | Hydroxypropyl starch ether | | 7.00 | | 5.00 | | 3.00 | |
| | Methylcellulose | | | 5.00 | | 10.00 | 3.00 | 5.00 |
| | Hydroxyethyl cellulose | 15.00 | | | 5.00 | | | |
| | Pectin | | | 5.00 | | | | |
| | Hydroxypropyl methylcellulose | | | | | 1.00 | | |
| | Pullulan | | | | 5.00 | | | 5.00 |
| | Konjac glucomannan | | | | | 2.00 | | |

TABLE 1-continued

| Parts by mass | | Example 1 | Example 2 | Example 3 | Example 4 | Example 5 | Example 6 | Example 7 |
|---|---|---|---|---|---|---|---|---|
| Amino acid surfactant | Sodium lauroyl methylaminopropionate | 14.00 | | | 2.00 | 2.00 | 5.00 | 15.00 |
| | Cocoyl methylaminopropionate | | 5.00 | | 3.00 | 5.00 | 4.00 | |
| | Sodium cocoyl apple amino acid | | | 11.00 | | 2.00 | 10.00 | 5.00 |
| | Sodium lauroyl aspartate | | | | 1.00 | 1.00 | 2.00 | 2.00 |
| | Sodium lauroyl glycinate | | 6.00 | | | 1.00 | 5.00 | 1.00 |
| | Sodium lauroyl glutamate | | | | | 12.00 | | 3.00 |
| | Sodium lauroyl sarcosinate | 14.00 | | 6.00 | 15.00 | 3.00 | 4.00 | 4.00 |
| Anionic surfacant | Sodium α-olefin sulfonate | | 4.00 | | | 8.00 | 4.00 | 10.00 |
| | Sodium alkyl polyglucoside sulfosuccinate | 2.00 | | | 2.00 | 1.00 | 1.00 | 2.00 |
| | Sodium alkyl hydroxyethyl sulfonate | | | 8.00 | | 5.00 | 10.00 | 8.00 |
| Nonionic surfactant | Decyl glucoside | | 2.00 | | 1.00 | 8.00 | | |
| | Sophorolipid | 3.00 | | 5.00 | 1.00 | | 5.00 | 1.50 |
| | Lauramidopropyl/cocamido propyl amine oxide | | 2.00 | | 1.00 | | 3.00 | |
| | Sucrose fatty acid ester | | | | 2.00 | | | |
| | Rhamnolipid | | | 5.00 | | | | |
| Amphoteric surfactant | Cocoamidopropyl betaine | | 2.00 | | | 1.00 | 1.00 | 1.00 |
| | Cocamidopropyl hydroxysultaine | 3.00 | | | 3.00 | 1.00 | 1.00 | |
| | Cocoamidoethyl betaine | | | 1.00 | | 1.00 | 1.00 | |
| | Sodium alkyl amphopropionate | | 2.00 | 1.00 | | 1.00 | | |
| | Sodium alkyl amphoacetate | | | 1.00 | | 1.00 | 1.00 | |
| Plant extract | *Plukenetia volubilis* fruit extract | 0.10 | | | 0.50 | | | |
| | *Theobroma grandiflorum* seed extract | 0.10 | | 0.10 | 0.50 | 0.10 | | 0.50 |
| | *Orbignya oleifera* kernel extract | 0.10 | | | 0.10 | | | 1.00 |
| | *Oryza sativa* bran extract | 1.00 | | | 1.00 | 0.10 | | 1.00 |
| | *Sapindus mukorossi* fruit extract | 0.50 | 1.00 | | | | | 1.00 |
| | *Camellia oleifera* seed cake extract | | 0.50 | | | | | 0.50 |
| | *Matricaria chamomilla* flower extract | | | 0.50 | | 0.50 | | 1.00 |
| | *Aloe barbadensis* leaf extract | | | | | 1.00 | | |
| Humectant | Allantoin | 0.50 | 1.00 | 0.50 | | 0.50 | 0.50 | 1.00 |
| | Dextran | | | | 1.00 | 0.50 | | 1.00 |
| | biomimetic phospholipid | 0.50 | | 0.50 | | 0.50 | | 1.50 |
| | Trehalose | | | 0.50 | | 0.50 | | 1.50 |
| Shape promoting agent | Propylene glycol | 4.00 | | | 2.00 | 1.00 | 3.00 | |
| | Glycerol | 5.00 | | | 4.00 | 2.00 | | 5.00 |
| | Butandiol | | 5.00 | | | 4.00 | 2.00 | 4.00 |
| | Hexanediol | | | 7.00 | | 4.00 | | |
| | Heptanediol | | | | | 2.00 | | |
| Chelating agent | Sodium citrate | | | | | | 2.00 | |
| | Sodium polyaspartate | 0.40 | | | | | 3.00 | |
| | Sodium polyglutamate | 0.40 | | | 0.20 | | | 0.50 |
| | Sodium gluconate | | | 0.20 | | | | |
| | Tetrasodium glutamate diacetate | | 0.15 | | | | | |
| | Trisodium methylglycine diacetate | | | | 0.20 | 0.20 | | |
| Enzymatic preparation | Protease | | | | 1.5 | 1 | 2 | 0.5 |
| | Cellulase | 0.5 | | | | | | |
| | Amylase | | | 0.5 | | 1 | | 0.5 |
| Essence | | 0.20 | 0.20 | 1.00 | | | 3.00 | |
| Water | | 100.00 | 30.00 | 65.00 | 74.00 | 45.00 | 100.00 | 90.00 |
| Total surfactant: plant polysaccharide | | 0.80 | 1.35 | 1.90 | 1.24 | 3.31 | 1.90 | 3.5 |
| Amino acid surfactant: anionic surfactant | | 14 | 2.75 | 2.13 | 10.50 | 1.86 | 2.00 | 1.5 |
| Plant polysaccharide: shape promoting agent | | 5.00 | 3.40 | 2.86 | 4.17 | 1.23 | 6.00 | 1.66 |

Comparative Example 1

A composition consisting of the following raw materials by mass percentages:

surfactant: 35%; polyvinyl alcohol: 24%; polyvinylpyrrolidone: 3%; essence: 0.100; pigment: 0.2%; *Aloe vera* oil: 0.2%; Cucumber oil: 0.2%; Nano-composite powder: 9%; and a balance of deionized water.

In the nano-composite powder, the raw materials are calculated by mass percentage based on 100% total nano-composite powder, including 58% nano-grade titanium dioxide, 36% nano-grade zinc oxide, and 6% nano-silver.

In the surfactant, the raw materials are calculated by mass percentage based on 100% total surfactant, including 13% decyl glucoside, 25% sodium lauroyl glutamate, 14% sodium lauryl sulfate, 9% cocamidopropyl betaine, 25% dodecyl diethanolamine, 5% sodium pyrrolidone carboxylate, 2% isopropyl palmitate, 2% sodium lauryl glucose carboxylate, and 5% behenyl trimonium chloride.

A method for preparing the composition, which included the following steps:

the polyvinyl alcohol and polyvinylpyrrolidone were mixed and stirred with the water at 90° C. for dissolution;

each component of the nano-composite powder was separately dispersed and dissolved in an equivalent mass of water; and the above materials were then mixed and stirred until uniform.

Comparative Example 2

The difference from Example 1 lies in that the raw material for preparing the cleansing and care composition is different, specifically as follows: the addition amount of the plant polysaccharide was 7 parts, and the plant polysaccharide was the hydroxyethyl cellulose; in Comparative Example 2, a ratio of a total mass of the amino acid surfactant, the anionic surfactant, the nonionic surfactant, and the amphoteric surfactant to a mass of the plant polysaccharide was 5.1:1.

Comparative Example 3

The difference from Example 1 lies in that the raw material for preparing the cleansing and care composition is different, specifically as follows:

An addition amount of the glycerol was 16 parts so that a total addition amount of the shape promoting agent was 20 parts, and in Comparative Example 3, a mass ratio of the plant polysaccharide to the shape promoting agent was 2.25:1.

Comparative Example 4

The difference from Example 1 lies in that the raw material for preparing the cleansing and care composition is different, specifically as follows:

An addition amount of the glycerol was 0 parts so that a total addition amount of the shape promoting agent was 4 parts, and in Comparative Example 4, a mass ratio of the plant polysaccharide to the shape promoting agent was 11.25:1.

Comparative Example 5

The difference from Example 1 lies in that the raw material for preparing the cleansing and care composition is different, specifically as follows:

An addition amount of the alginate was 50 parts, an addition amount of the water is 105 parts, and a ratio of a total mass of the amino acid surfactant, the anionic surfactant, the nonionic surfactant and the amphoteric surfactant to a mass of the plant polysaccharide was 0.55:1.

Comparative Example 6

The difference from Example 1 lies in that the raw material for preparing the cleansing and care composition is different, specifically as follows:

An addition amount of the sodium alkyl polyglucoside sulfosuccinate was 1.4 parts, resulting in a total addition amount of the anionic surfactant of 1.4 parts, wherein a mass ratio of the amino acid surfactant to the anionic surfactant was 20:1.

Application Example 1

A cleansing and care tablet produced by drying and then slicing the cleansing and care composition prepared in Example 1.

The drying method was a casting method, specifically the slurry was cast, conveyed in parallel and then formed through air-blowing drying equipment.

Application Examples 2 to 7

The difference between Application Examples 2 to 7 to Application Example 1 of the cleansing and care tablets lies in that the cleansing and care tablets of Application Examples 2 to 7 were respectively formed by drying and then slicing the cleansing and care compositions prepared in Examples 2 to 7.

Comparative Application Example 1-Comparative Application Example 6

The difference between Comparative Application Examples 1 to 6 of the cleansing and care tablets and Application Example 1 lies in that the cleansing and care tablets of Comparative Application Examples 1 to 6 were respectively formed by drying and then slicing the cleansing and care compositions prepared in Comparative Examples 1 to 6.

The cleansing and care tablets prepared in Application Examples 1 to 7 were well-formed without powder loss and brittleness, wherein the microscopic view of the cleansing and care tablet in Application Example 1 is as shown in FIG. 1. Application Example 1 uses the plant polysaccharide as the film-forming agent. The overall structure of the cleansing and care tablet in Application Example 1 exhibits an irregularly distributed pattern resembling natural fibers, where a porous network structure or minor inhomogeneities are observable. Modification groups in the film-forming agent disrupt the regularity of molecular chains, significantly reducing crystallinity, which renders the cleansing and care tablet more flexible and readily dissolvable compared to PVA-based tablets.

Figure 2:
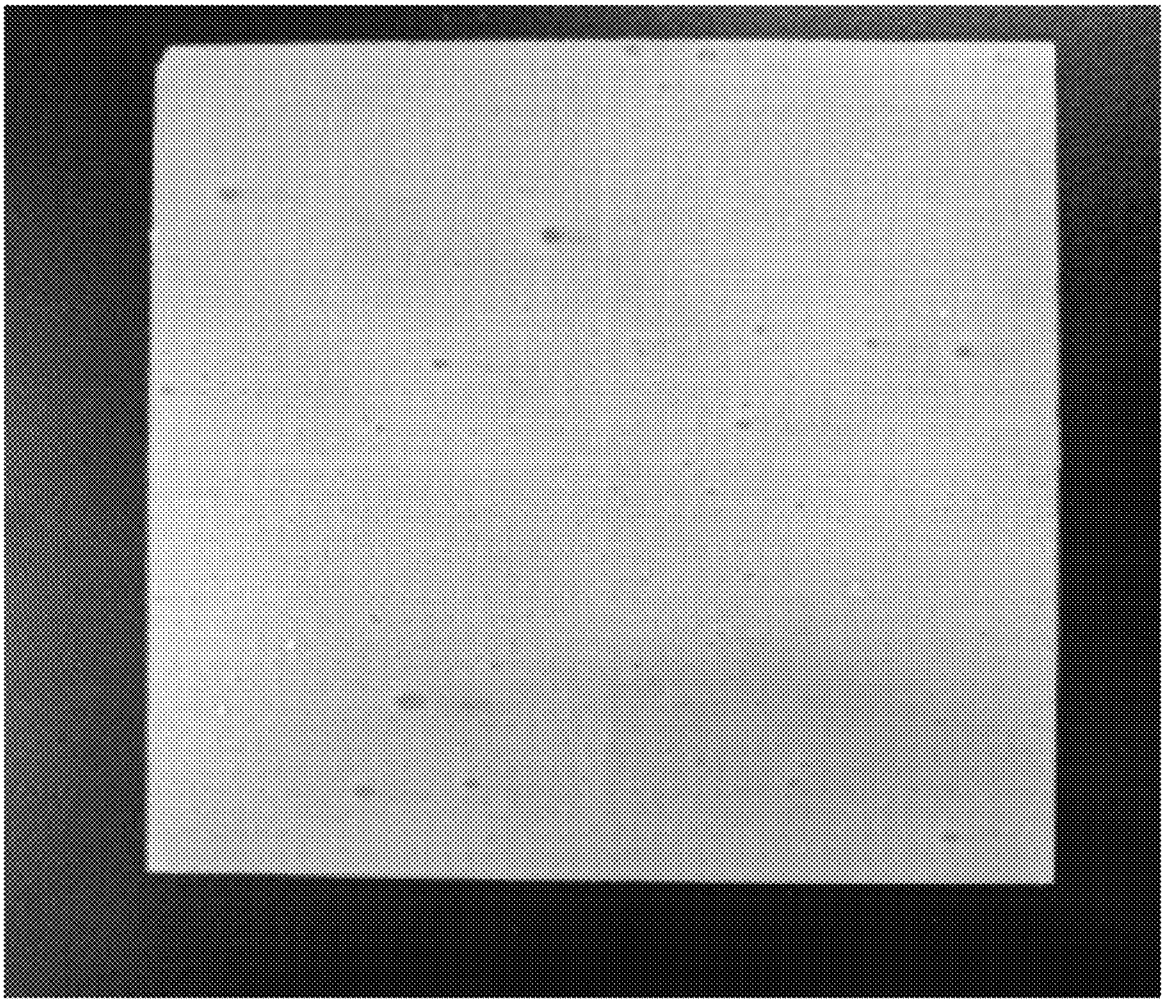
FIG. 2 is a configuration of the cleansing and care tablet after being folded in half in Application Example 1 of the present application.

Furthermore, after folding the cleansing and care twice and then unfolding, the cleansing and care table shows no damage with imperceptible creases. The cleansing and care tablet after being folded in half in Application Example 1 is as shown in FIG. 2.

This demonstrates that while using amino acid surfactant as the main surfactant, the cleansing and care tablet of the present application achieves successful forming with excellent flexibility. Moreover, the film-forming agent contains no petroleum-based polyethylene glycol or polyvinyl alcohol, thereby ensuring environmental compatibility.

Figure 3:
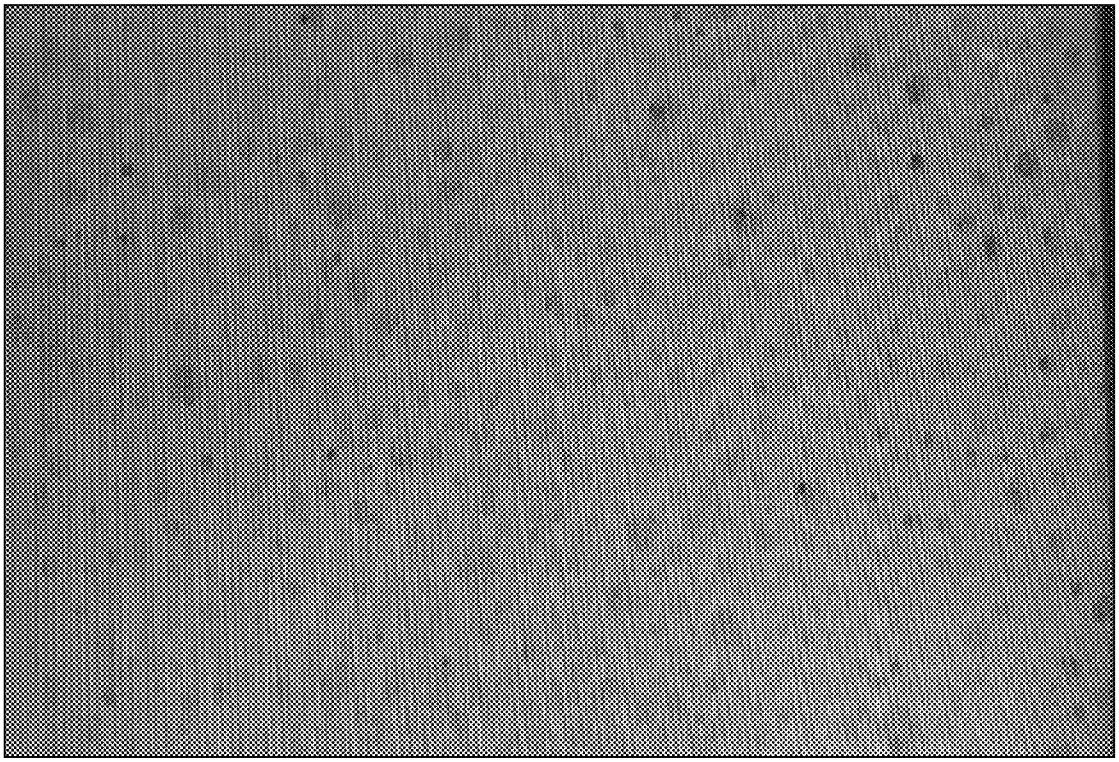
FIG. 3 is an enlarged micro-configuration of a cleansing and care tablet in Comparative Application Example 1 of the present application.

Comparative Application Example 1 uses petrochemical-sourced polyvinyl alcohol as the film-forming agent. The pore distribution of the cleansing and care tablet in Comparative Application Example 1 exhibits greater density and uniform smoothness due to the relatively ordered molecular chains of PVA, where hydroxyl groups form strong intramolecular and intermolecular hydrogen bonds; and unmodified PVA develops well-defined crystalline regions, as shown in FIG. 3. Even when rapidly dried during the film-forming process, the film typically contains a high proportion of crystalline regions. These crystalline regions act like physical crosslinking points, providing strength and rigidity, but also contributing to the brittleness.

Figure 4:
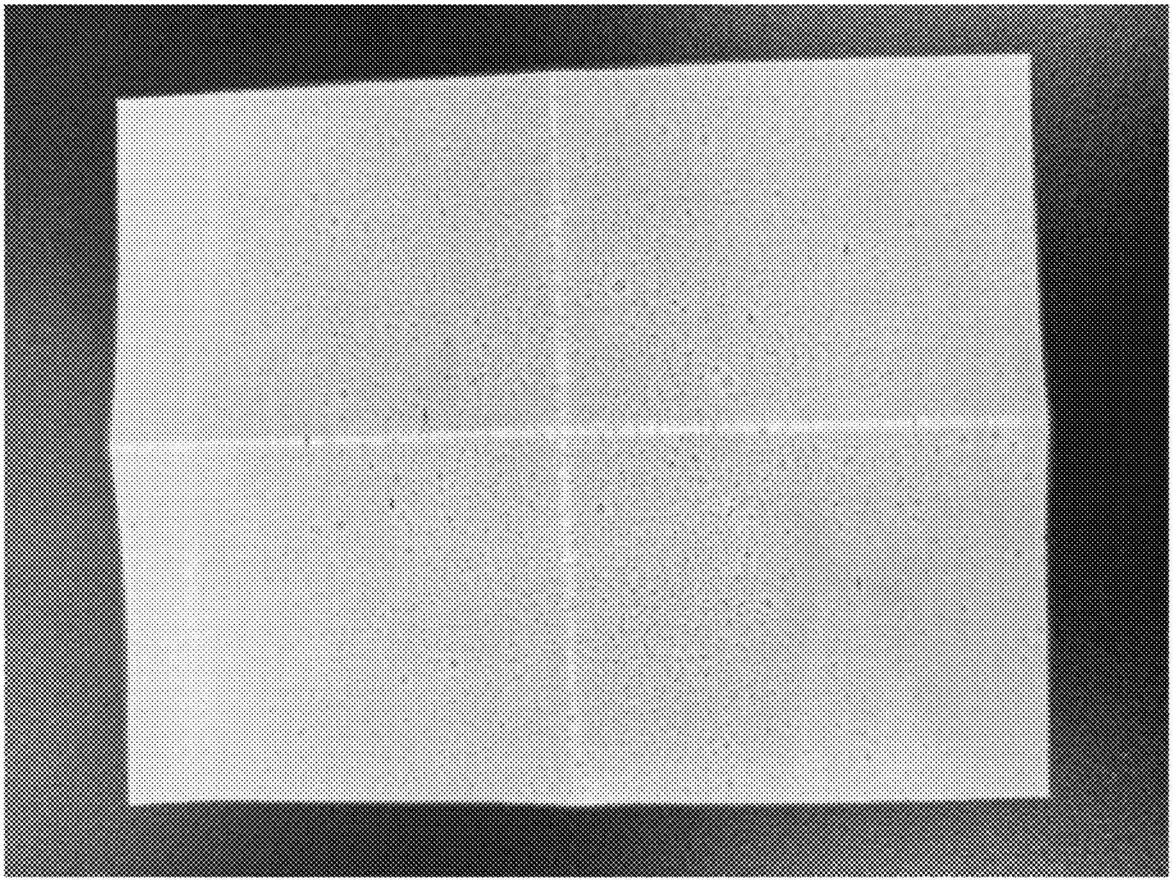
FIG. 4 is a configuration of the cleansing and care tablet after being folded in half in Comparative Application Example 1 of the present application.

In Comparative Example 1, although the cleansing and care tablet produced could be formed, the flexibility was poor. After folding the cleansing and care tablet twice and then unfolding, the creases were clearly visible, and the cleansing and care tablet could not return to the original shape, as shown in FIG. 4.

Figure 5:
FIG. 5 is a configuration of a cleansing and care tablet in Comparative Application Example 2 of the present application.

In Comparative Example 2, the product could not form a tablet after drying and instead appeared granular, as shown in FIG. 5.

Figure 6:
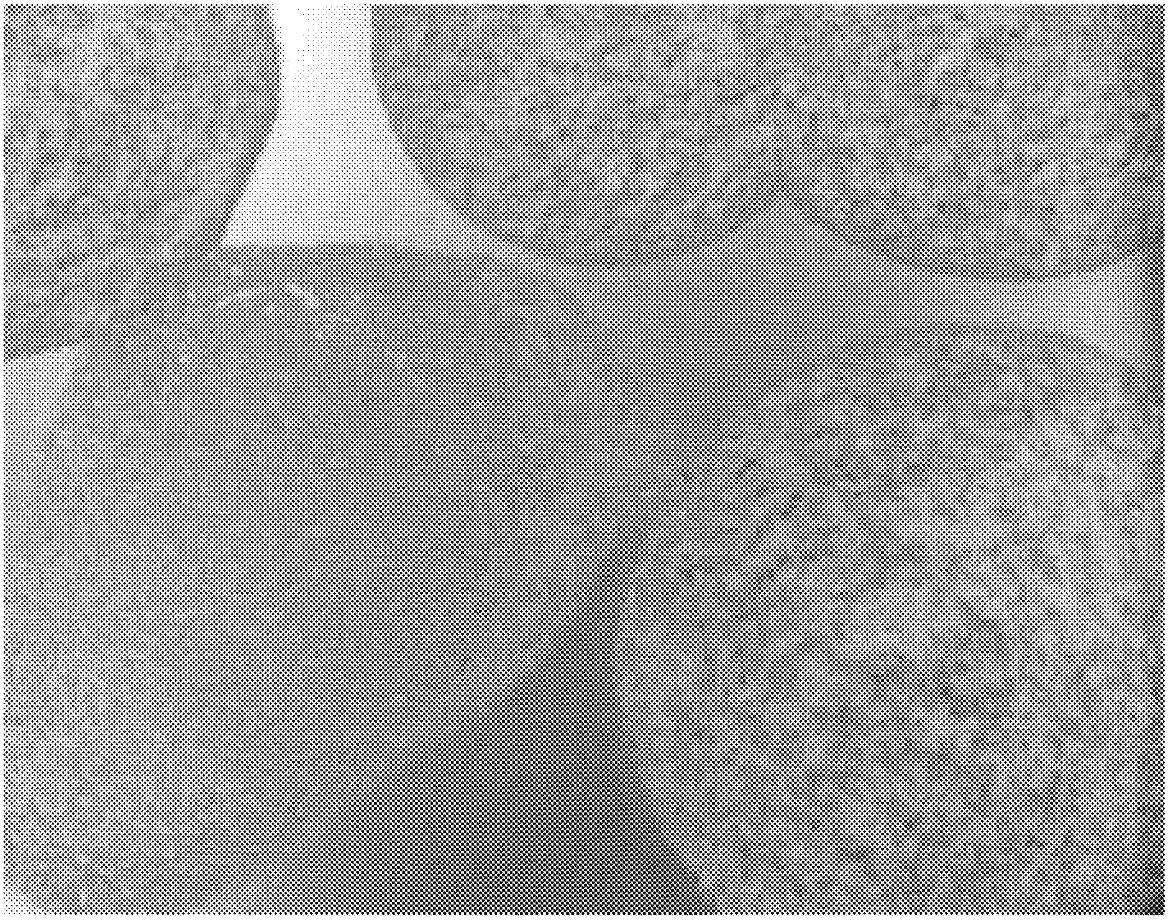
FIG. 6 is a configuration of a cleansing and care tablet in Comparative Application Example 3 of the present application.

In Comparative Example 3, the cleansing and care tablet produced could not be dried into a tablet, as the cleansing and care tablet absorbed moisture severely, as shown in FIG. 6.

Figure 7:
FIG. 7 is a configuration of a cleansing and care tablet in Comparative Application Example 4 of the present application.

In Comparative Example 4, the cleansing and care tablet produced exhibited significant brittleness, fracturing directly upon being folded once, as shown in FIG. 7.

In Comparative Example 5, the cleansing and care tablet produced showed severe brittleness and could not dissolve completely when immersed in water.

In Comparative Example 6, low viscosity of the slurry prevented the formation of a tablet.

The results of these comparative examples demonstrate that, through the proportional combination of the plant polysaccharide, amino acid surfactant, and other surfactants, the present application overcomes the issue of mutual interference between surfactant micelles, thereby achieving a well-formed and highly flexible cleansing and care tablet.

Performance Test

The cleansing and care tablets prepared in the Application Examples and Comparative Application Examples were subjected to the following tests.

1. Fabric Stain-Removing Test.

The detergency is determined according to GB/T 13174-2021 "Determination of detergency and cycle of washing property for laundry detergents", the washing water is 250 mg/kg $CaCl_2$ hard water, the test cloth is national standard carbon black JB-01 dirty cloth, national standard protein JB-02 dirty cloth and national standard sebum JB-03 dirty cloth. The stain-removing ratio (Pi) was determined at a sample concentration of 0.050, with a 0.2 standard liquid detergent as a control, wherein when Pi≥1.0 was qualified, Pi<1.0 was unqualified. The results are as shown in Table 2.

TABLE 2

| | Stain-removing results | | | |
|---|---|---|---|---|
| | National standard carbon black-soiled fabric | National standard protein-soiled fabric | National standard sebum-soiled fabric | Determination |
| Application Example 1 | 1.59 | 1.32 | 1.88 | Qualified |
| Application Example 2 | 1.56 | 1.43 | 1.93 | Qualified |
| Application Example 3 | 1.44 | 1.34 | 1.84 | Qualified |
| Application Example 4 | 1.20 | 3.29 | 1.87 | Qualified |
| Application Example 5 | 1.62 | 1.59 | 1.86 | Qualified |
| Application Example 6 | 1.48 | 2.87 | 1.73 | Qualified |
| Application Example 7 | 1.52 | 2.04 | 1.76 | Qualified |
| Comparative Application Example 1 | 1.13 | 1.05 | 1.30 | Qualified |

2. Skin Moisture and Sebum Content Test.

Test subjects: a total of 100 volunteers aged 22 to 30 were selected and divided into 10 groups, with 10 volunteers in each group. The cleansing and care table product was used to the same area on the inner side of the volunteers' arms. During the test, no cosmetics other than the test product were allowed to be used.

Test Process: before use, the test skin area was rinsed with clean water and gently patted dry with a towel until no surface moisture remained. After waiting for 10 minutes, a skin moisture analyzer was used to measure the sebum and moisture content of the volunteers' skin. After cleansing with the cleansing and care table product, the skin was gently patted dry with a towel until no surface moisture remained. After another 10-minute wait, the sebum and moisture content were measured again using the skin moisture analyzer.

The moisture content change rate (WE %) was used to evaluate the product's exfoliation effect, and the sebum content change rate (OE %) was used to evaluate the product's oil-removal effect. The specific calculation formulas are as follows:

$$\text{Moisture Content Change Rate (WE \%)} = [(\text{Moisture content after using the product} - \text{Moisture content before using the product}) / \text{Moisture content before using the product}] \times 100\%;$$

$$\text{Sebum Content Change Rate (OE \%)} = [(\text{Sebum content after using the product} - \text{Sebum content before using the product}) / \text{Sebum content before using the product}] \times 100\%;$$

For each group, the average WE % and OE % of the 10 volunteers were calculated and recorded as the group's WE % and OE %. The overall average WE % and OE % of the exfoliating cleansing tablet were then determined by averaging the WE % and OE % values across all 10 groups. The results are as shown in Table 3.

TABLE 3

| Changes in skin moisture and sebum content | | |
|---|---|---|
| | WE mean (%) | OE mean (%) |
| Application Example 1 | 24.13 | −8.33 |
| Application Example 2 | 13.64 | −6.67 |

3. Product Safety Test.

In vitro skin irritation test was conducted, the human skin model test was conducted according to OECD TG 439. The test results are as shown in Table 4.

TABLE 4

In vitro skin irritation test results

| | $OD_{570}$ Hole 1 | $OD_{570}$ Hole 2 | Mean value | Blank-corrected mean value (inter-well) | Blank-corrected mean value (inter-group) | Relative viability % | Mean value | Conclusion |
|---|---|---|---|---|---|---|---|---|
| Blank | 0.050 | 0.048 | 0.049 | | — | — | — | — |
| PBS solution of negative control group | 1.463 | 1.493 | 1.478 | 1.429 | 1.412 ± 0.017 | 101.2 | 100.0 ± 1.2 | Non-irritating |
| | 1.487 | 1.400 | 1.444 | 1.395 | | 98.8 | | |
| | 1.462 | 1.461 | 1.462 | 1.413 | | 100.0 | | |
| 5% lauryl sodium sulfate solution of positive control group | 0.06 | 0.062 | 0.061 | 0.012 | 0.01 ± 0.002 | 0.8 | 0.7 ± 0.1 | Irritating |
| | 0.058 | 0.056 | 0.057 | 0.008 | | 0.6 | | |
| | 0.062 | 0.058 | 0.060 | 0.011 | | 0.8 | | |
| Application Example 1 | 0.83 | 0.824 | 0.827 | 0.778 | 0.776 ± 0.003 | 55.1 | 54.9 ± 0.2 | Non-irritating |
| | 0.813 | 0.830 | 0.822 | 0.773 | | 54.7 | | |
| | 0.827 | 0.824 | 0.826 | 0.777 | | 55.0 | | |
| Comparative Application Example 1 | 0.460 | 0.505 | 0.483 | 0.434 | 0.447 ± 0.014 | 29.8 | | Irritating |
| | 0.467 | 0.525 | 0.496 | 0.447 | | 30.7 | 30.7 ± 0.9 | |
| | 0.495 | 0.524 | 0.510 | 0.461 | | 31.7 | | |

In vitro skin corrosion test was conducted. The reconstructed human epidermis (RhE) test was conducted according to OECD TG 431 (2019), with classification determined in compliance with GB/T 26396-2011 "Technical specification for safety of soaps and detergents". The test results are as shown in Table 5.

TABLE 5

In vitro skin corrosion test results

| Group | Processing time | Mean absorbance | Mean viability (%) | Conclusion |
|---|---|---|---|---|
| Negative control group (0.9% NaCl) | 240 min | 1.5674 ± 0.0619 | 100.00 ± 3.95 | Non-corrosive |
| | 60 min | 1.3091 ± 0.0215 | 100.00 ± 1.64 | |
| | 3 min | 1.5314 ± 0.0136 | 100.00 ± 0.89 | |
| Positive control group (glacial acetic acid) | 240 min | 0.0449 ± 0.0142 | 2.86 ± 0.91 | Corrosive |
| Application Example 2 | 240 min | 1.6020 ± 0.0206 | 102.21 ± 1.32 | Non-corrosive |
| | 60 min | 1.2689 ± 0.0584 | 96.93 ± 4.46 | |
| | 3 min | 1.5158 ± 0.0272 | 98.99 ± 1.78 | |

5. Degradation Test.

The test was conducted according to the method in Appendix A of "Test Method for Biodegradability of Surfactants" (GB/T 15818-2018), with compliance determined based on the requirement in "Technical specification for safety of soaps and detergents" (GB/T 26396-2011) that the primary biodegradation degree of surfactants shall not be less than 90%. The test results are as shown in Table 6.

TABLE 6

Degradability results

| | The average biodegradation degree at Day 7 (D7 %) |
|---|---|
| Reference object (Sodium linear dodecylbenzene sulfonate) | 98.7 |
| Application Example 1 | 99.9 |
| Application Example 2 | 99.7 |
| Comparative Application Example 1 | 88.2 |

Based on the comprehensive test results, it can be concluded that the cleansing and care composition prepared in the examples can achieve excellent cleansing and care tablet formation effects while containing amino acid surfactants. The cleansing and care tablet exhibits high flexibility, strong stain-removing capability, no skin irritation, and demonstrates both exfoliation and oil-removal effects, thereby satisfying skin cleansing requirements. Furthermore, by replacing petroleum-based polyvinyl alcohol with bio-based plant polysaccharides, the cleansing and care tablet complies with current environmental protection standards for cleaning products.

This specific embodiment is provided solely for explaining the present application and shall not be construed as limiting the present application. Any person skilled in the art may, after reading this specification, make modifications to this specific embodiment as needed without creative contribution, provided that such modifications fall within the scope of the claims of the present application and shall be protected under patent law.

What is claimed is:

1. A cleansing and care composition, wherein a raw material for preparing the cleansing and care composition comprises the following components in parts by mass:

amino acid surfactant: 10-30 parts; anionic surfactant: 1-20 parts; plant polysaccharide: 15-45 parts; shape promoting agent: 5-15 parts; nonionic surfactant: 1-10 parts; amphoteric surfactant: 0.5-5 parts; plant extract: 0.5-5 parts; humectant: 0.5-5 parts; chelating agent: 0.1-5 parts; essence: 0-5 parts; enzymatic preparation: 0-5 parts; and water: 20-100 parts;

wherein a mass ratio of the amino acid surfactant to the anionic surfactant is (1.5-14):1, a ratio of a total mass of the amino acid surfactant, the anionic surfactant, the nonionic surfactant, and the amphoteric surfactant to a mass of the plant polysaccharide is (0.8-3.5):1, and a mass ratio of the plant polysaccharide to the shape promoting agent is (1-6):1;

wherein the amino acid surfactant comprises at least two of sodium lauroyl/cocoyl methylaminopropionate, sodium lauroyl/cocoyl methyltaurate, sodium cocoyl apple amino acid, sodium lauroyl aspartate, sodium lauroyl/cocoyl glycinate, sodium lauroyl/cocoyl glutamate, or sodium lauroyl/cocoyl sarcosinate;

wherein the plant polysaccharide comprises at least two of alginate, pectin, xanthan gum, guar gum, hydroxypropyl starch ether, methyl cellulose, hydroxyethyl cellulose, konjac glucomannan, hydroxypropyl methyl cellulose, or pullulan;

wherein the shape promoting agent is a $C_3$-$C_8$ polyol.

2. The cleansing and care composition according to claim 1, wherein the anionic surfactant comprises at least one of sodium alkyl glycoside sulfosuccinate, sodium $\alpha$-olefin sulfonate, or sodium alkyl hydroxyethyl sulfonate.

3. The cleansing and care composition according to claim 1, wherein the nonionic surfactant comprises at least one of $C_{8-18}$ alkyl glycoside, sophorolipid, rhamnolipid, lauramidopropyl/cocamidopropyl amine oxide, or sucrose fatty acid ester; and the amphoteric surfactant comprises at least one of lauramidopropyl/cocamidopropyl hydroxysultaine, lauramidopropyl/cocamidopropyl betaine, cocamidoethyl betaine, lauryl/cocoyl hydroxysultaine, sodium lauroyl/cocoyl amphoacetate, or sodium lauroyl/cocoyl amphopropionate.

4. The cleansing and care composition according to claim 1, wherein the chelating agent comprises at least one of sodium citrate, sodium gluconate, tetrasodium glutamate diacetate, trisodium methylglycine diacetate, sodium polyaspartate, or sodium polyglutamate.

5. The cleansing and care composition according to claim 1, wherein the humectant comprises at least one of allantoin, dextran, biomimetic phospholipid, trehalose, or water-soluble olive oil.

6. A method for preparing the cleansing and care composition according to claim 1, comprising the following steps:

mixing the plant polysaccharide with the shape promoting agent under stirring to wet a solid powder of the plant polysaccharide with the shape promoting agent to obtain a premix;

mixing the anionic surfactant and the amino acid surfactant with a pre-heated water, and after standing until completely dissolved into a homogeneous phase, adding the premix in batches under stirring to obtain a mixture; and adding the nonionic surfactant and the amphoteric surfactant to the mixture; adding the chelating agent to adjust a value of pH to 5.5-7; adding the plant extract and continuing stirring; adding the humectant and continuing the stirring; and adding the enzymatic preparation in liquid form and the essence to obtain the cleansing and care composition.

7. A cleansing and care tablet, wherein the cleansing and care tablet is produced by drying and then slicing the cleansing and care composition according to claim 1; wherein, when the enzymatic preparation in the cleansing and care composition is in solid form, the enzymatic preparation is not added when preparing the cleansing and care composition, but is instead sprinkled onto sliced tablets.

* * * * *